United States Patent [19]
Magara et al.

[11] Patent Number: 6,043,447
[45] Date of Patent: Mar. 28, 2000

[54] DISCHARGE MACHINING APPARATUS

[75] Inventors: Takuji Magara; Takashi Yuzawa, both of Nagoya, Japan

[73] Assignee: Mitsubishi Denki Kabushiki Kaisha, Tokyo, Japan

[21] Appl. No.: 08/986,158

[22] Filed: Dec. 5, 1997

[30] Foreign Application Priority Data

Jun. 12, 1997 [JP] Japan ..................................... 9-155608

[51] Int. Cl.⁷ ............................... B23H 1/02; B23H 7/16
[52] U.S. Cl. ..................................... 219/69.16; 219/69.19
[58] Field of Search ............................ 219/69.16, 69.19, 219/69.13

[56] References Cited

U.S. PATENT DOCUMENTS

| | | | |
|---|---|---|---|
| 4,608,476 | 8/1986 | Shimizu | 219/69.16 |
| 4,733,040 | 3/1988 | Pelloni et al. | 219/69.16 |
| 5,051,554 | 9/1991 | Tsukamoto | 219/69.16 |
| 5,064,985 | 11/1991 | Yoshizawa et al. | 219/69.16 |
| 5,354,961 | 10/1994 | Diot et al. | 219/69.13 |
| 5,847,352 | 12/1998 | Yuzawa et al. | 219/69.16 |
| 5,852,268 | 12/1998 | Buhler et al. | 219/69.16 |
| 5,919,380 | 7/1999 | Magara et al. | 219/69.16 |

*Primary Examiner*—Geoffrey S. Evans
*Attorney, Agent, or Firm*—Sughrue, Mion, Zinn, Macpeak & Seas, PLLC

[57] ABSTRACT

In machining, a short-circuit determination reference time stored in a parameter memory is changed by a short-circuit determination reference time changing device in response to rpm or a rotational speed of a rotating electrode, duration of a short-circuit detected between the electrodes is measured by a short-circuit duration time determining device, and a short-circuit evading operation is executed by a short-circuit back control device in a case where the duration of a short-circuit has surpassed the short-circuit determination reference time.

8 Claims, 10 Drawing Sheets

DISCHARGE MACHINING APPARATUS

FIELD OF THE INVENTION

The present invention relates to a discharge machining apparatus, and more specifically to a discharge machining apparatus for executing discharge machining to a workpiece making use of a simple-formed electrode.

BACKGROUND OF THE INVENTION

FIG. 8 is a block diagram showing a principle of a discharge machining apparatus based on the conventional technology. In FIG. 8, designated at the reference numeral 21 a pipe-shaped electrode, at 22 a workpiece to be machined by means of discharge machining, at 23 a machining power supply unit for supplying a power, at 24 a rotating device for rotating the electrode 21, at 27 a short-circuit detecting circuit for detecting generation of a short-circuit between the electrodes, and at 28 a short-circuit back control circuit for executing a short-circuit evading operation for the electrode 21 with the short-circuit detecting circuit 27. Also, H indicates a machining feed of the electrode 21 in the X- and Y-axial directions, and V indicates a feed in the Z-axial direction for compensating depletion of the electrode 21.

Next description is made for operations. In the discharge machining operation shown in FIG. 8, machining is executed in a state where a shape of the electrode is kept under stable conditions by applying a voltage to a space between the electrodes 21 mutually opposing to each other and the workpiece 22, and synthesizing a Z-axial direction component feed V for compensating a depletion rate of the electrode in the longitudinal direction thereof and X- or Y-axial direction component feed H. As a result, a constant shape can be obtained without compensating depletion of the electrode in the sideward direction.

In the discharge machining apparatus described above, when machining is started, the electrode 21 is rotated by the rotating device 24 to execute machining, but in a case where of the electrode 21 having an especially small diameter is maintained by such a device as a collet chuck, axial deflection of the electrode 21 easily occurs in the horizontal direction as shown in FIG. 9A and FIG. 9B. Namely, assuming that a periphery of the electrode 21 rotating in a state where axial deflection has not occurred, the peripheral is widened up to W2 because it displaces to the outer side because of axial deflection by e as shown in the figure. Actually, as shown in FIG. 10, axial deflection occurs in the directions of points A, B, C, and D. Because of this axial deflection, a short-circuit is generated by this axial deflection between the electrode 21 and the work 22.

FIG. 11 is a view plotted with generation of short-circuit due to axial deflection on the time axis. Generation of each short-circuit is detected by the short-circuit detecting circuit 27. When Ts (t) becomes longer than a prespecified period of time in the state where a short-circuit is generated as shown at point B in FIG. 10, the short-circuit back control circuit 28 executes a short-circuit back operation for evading a short-circuit.

Generally it is difficult to suppress axial deflection to zero during machining with a rotating electrode, and a time zone Ts, in which a short-circuit is continued during one rotation, is generated. When a speed of electrode rotation is filly high (several thousands to several tens of thousands rotations/min or more), the short-circuit duration time Ts becomes shorter than the short-circuit determination reference time, and a short-circuit evading operation is not executed.

Namely feeds V, H of the electrode 21 are controlled by an ordinary inter-polar servo. On the other hand, when the rotational speed is low (several tens to several hundreds rotations/min), the short-circuit duration time Ts becomes longer than the short-circuit determination reference time, so that a short-circuit evading operation or a short-circuit back operation is executed in each rotation. In the state as described above, machining enters an extremely unstable hunting state with the machining speed remarkably lowered.

The discharge machining apparatus based on the conventional technology has the configuration as described above, and when the rotational speed is low, a short-circuit evading operation, namely a short-circuit back operation is executed in each rotation of the electrode, and machining enters into a hunting state, and the machining speed is disadvantageously lowered. To overcome this problem, it is necessary to increase the rotational speed, but in this case cost of the rotating unit becomes expensive, and the machine may deform due to heat emission when rotated at a high speed, which in turn, for instance, remarkably lowers the machining precision.

SUMMARY OF THE INVENTION

It is an object of the present invention to provide a discharge machining apparatus which can stabilize machining by suppressing an unnecessary short-circuit evading operation caused on axial deflection of an electrode during machining in discharge machining for machining a profile of a work by means of rotating a simple-formed electrode and further can remarkably improve the machining speed and machining precision.

With the present invention, when machining a work, the short-circuit determination reference time is changed according to rpm or the rotational speed of the rotating electrode, duration of a short-circuit detected between electrodes is measured, and a short-circuit is evaded when the duration of a short-circuit has surpassed the short-circuit determination reference time; whereby discharge machining is executed by changing the short-circuit determination reference time according to rpm or the rotational speed of the rotating electrode; as a result, it is possible to suppress an unnecessary short-circuit evading operation caused by axial deflection of the electrode during machining as well as to stabilize machining operations, which enables to extremely improve a machining speed as well as machining precision.

With the present invention, the short-circuit determination reference time is changed according to decrease of the rpm or a rotational speed of the electrode so that the short-circuit determination reference time becomes longer, whereby a short-circuit generated for one rotation due to axial deflection is neglected and stabilized machining without hunting can be executed, and as a result it is possible to properly execute electrode-feed control based on an average voltage between the electrodes even though a microscopic short-circuit for one rotation is neglected as mentioned above.

With the present invention, discharge machining is executed by automatically adjusting the short-circuit determination reference time according to a change of rpm or a rotational speed of the electrode so that machining efficiency becomes maximum; whereby in a case where axial deflection rate and machining conditions are changed, it is possible to suppress an unnecessary short-circuit evading operation caused by axial deflection of the electrode during machining as well as to stabilize machining; as a result the feature as described above enables to remarkably improve a machining speed as well as machining precision.

With the present invention, when machining a work, a speed of the short-circuit evading operation or short-circuit back gain is changed according to rpm or the rotational speed of the rotating electrode, duration of a short-circuit detected between electrodes is measured, and a short-circuit is evaded according to the speed of the short-circuit evading operation or short-circuit back gain when the duration of a short-circuit has surpassed the short-circuit determination reference time; whereby discharge machining is executed by changing the short-circuit back gain according to the rpm or the rotational speed of the rotating electrode; as a result, it is possible to suppress an unnecessary short-circuit evading operation caused by axial deflection of the electrode during machining as well as to stabilize machining, which enables to extremely improve a machining speed as well as machining precision.

With the present invention, a speed of the short-circuit evading operation or short-circuit back gain is changed according to decrease of the rpm or rotational speed to make the parameter further smaller, whereby an operation for evading a short-circuit due to a short-circuit generated for one rotation because of axial deflection is suppressed and machining without hunting can be stably executed, as a result it is possible to properly execute electrode-feed control based on an average voltage between the electrodes even if a microscopic short-circuit for one rotation is neglected as described above.

With the present invention, discharge machining is executed by automatically adjusting a speed of the short-circuit evading operation or short-circuit back gain according to a change of rpm or a rotational speed of the electrode so that machining efficiency becomes maximum; whereby, even in a case where axial deflection rate and a machining condition are changed, it is possible to suppress an unnecessary short-circuit evading operation caused by axial deflection of the electrode during machining as well as to stabilize machining; as a result the feature described above enables to extremely improve a machining speed as well as machining precision.

Other objects and features of this invention will become understood from the following description with reference to the accompanying drawings.

DESCRIPTION OF THE PREFERRED EMBODIMENT

Next description is made below for the most preferable embodiments of a discharge machining apparatus according to the present invention with reference to attached drawings.

Figure 1:
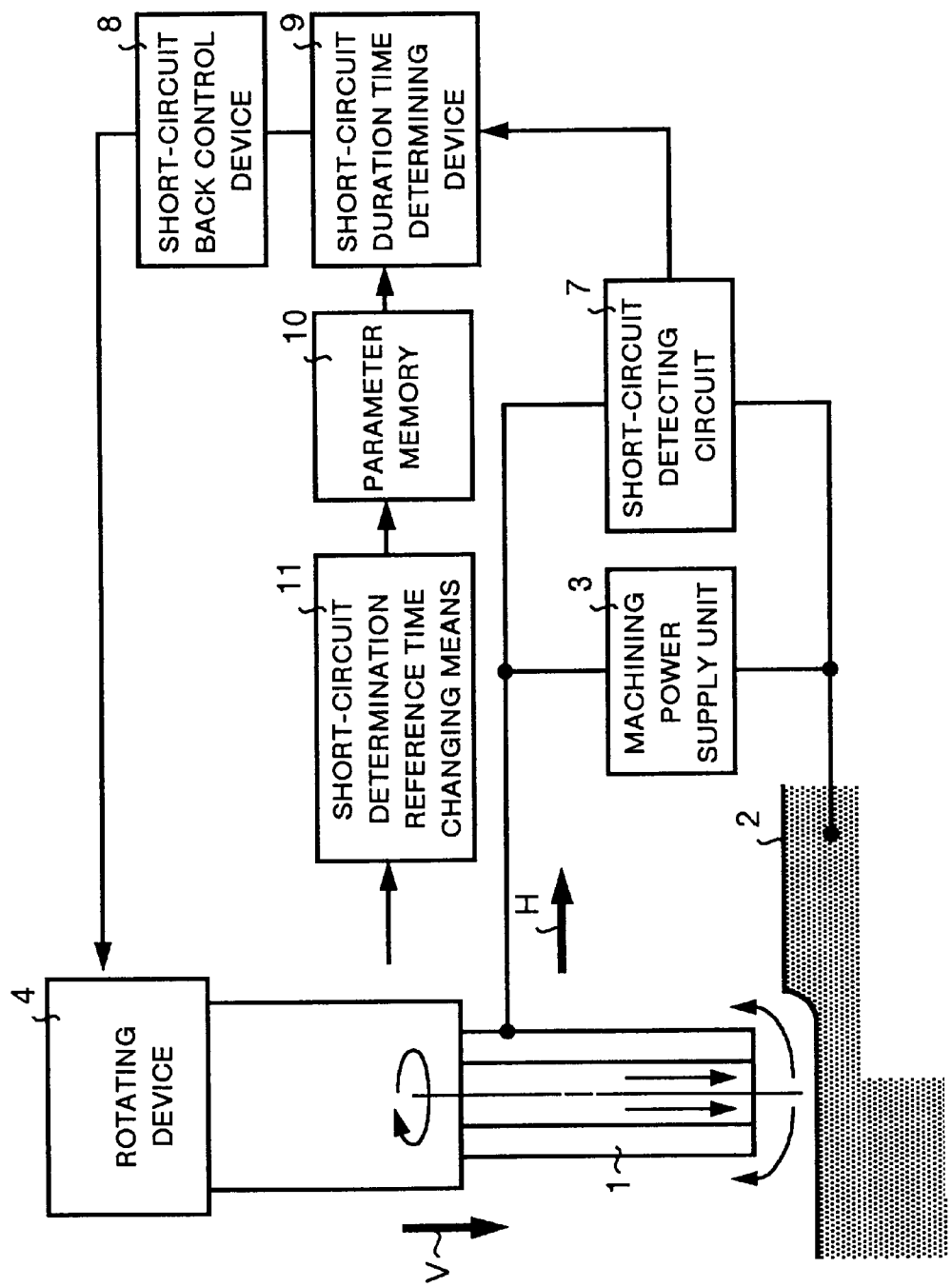
FIG. 1 is a view showing configuration of a discharge machining apparatus according to Embodiment 1 of the present invention.

At first, description is made for configuration of the invention. FIG. 1 is a view showing configuration of a discharge machining apparatus according to Embodiment 1 of the invention; and in this view, designated at the reference numeral 1 is a pipe-shaped electrode, at 2 a work to be machined, at 3 a machining power supply unit for supplying a power, at 4 a rotating device for rotating the electrode 1, at 7 a short-circuit detecting circuit for detecting generation of a short-circuit between the electrodes during machining, at 9 a short-circuit duration time determining device for determining whether an output from the short-circuit detecting circuit 7 has continued for a specified time, at 8 a short-circuit back control device for executing a short-circuit evading operation for the electrode 1 in a case where duration of a short-circuit has surpassed the specified period of time, at 10 a parameter memory for setting a short-circuit determination reference time (a specified value for determining the duration of a short-circuit), and at 11 a short-circuit determination reference time changing means for changing the short-circuit determination reference time according to rpm (or a rotational speed) of the electrode 1.

Figure 2:
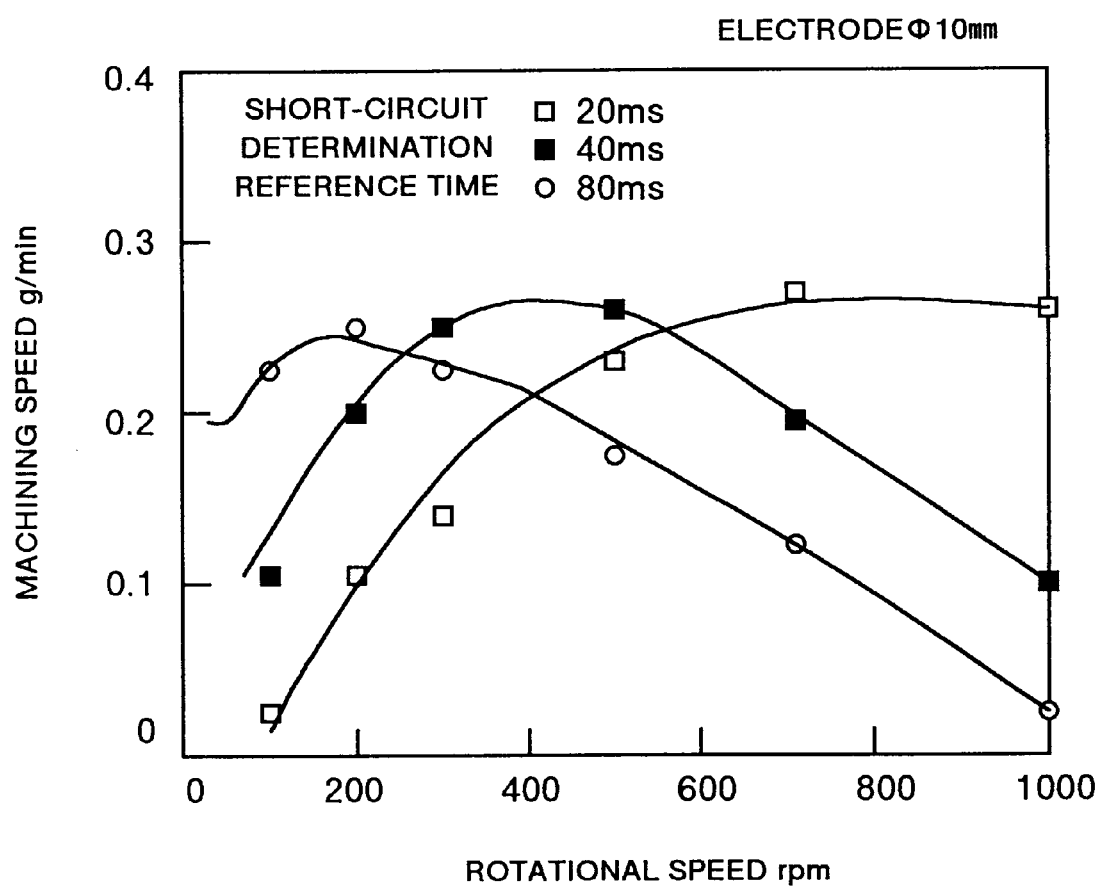
FIG. 2 is a graph showing a relation between a machining speed and a rotational speed in Embodiment 1.
Figure 3:
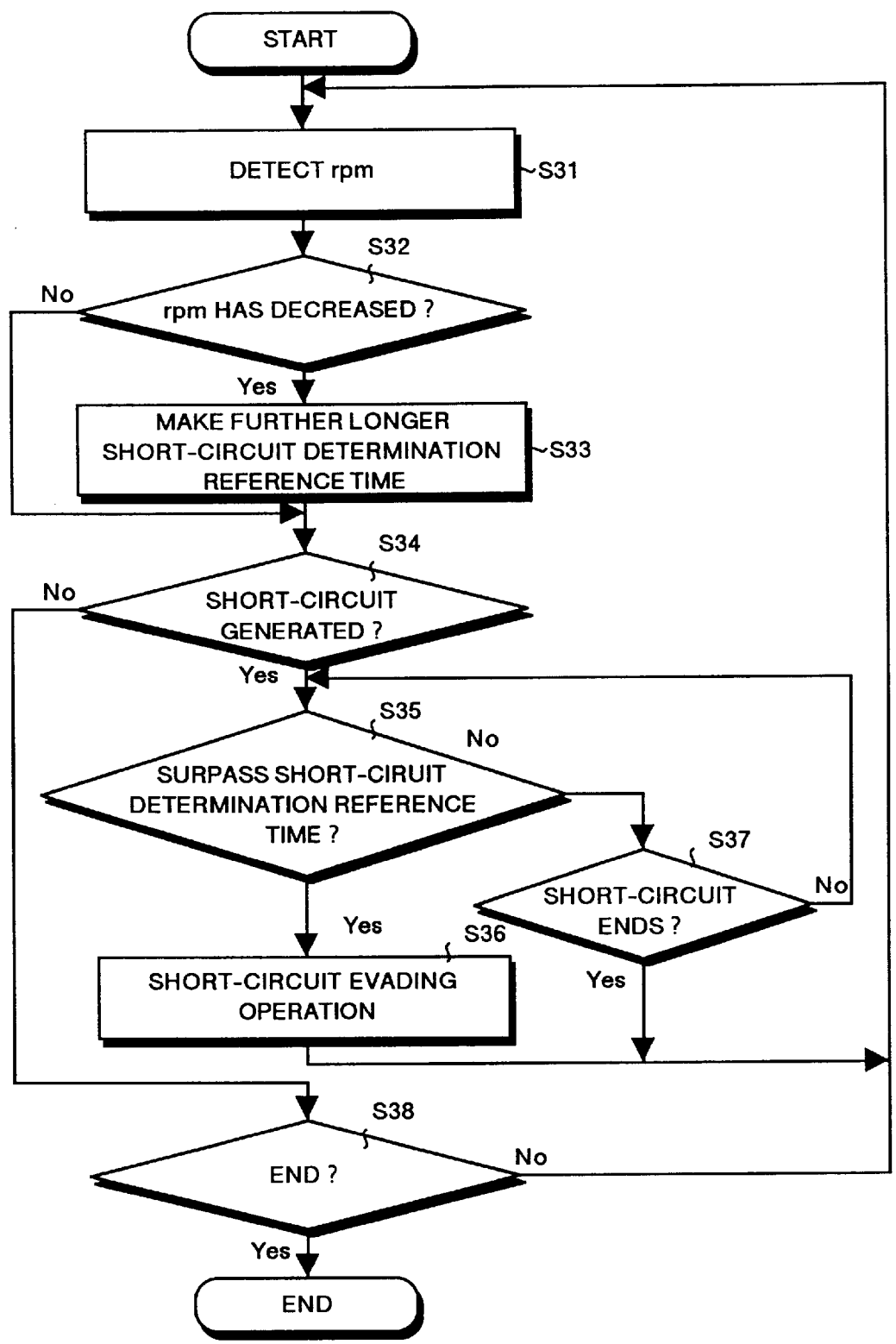
FIG. 3 is a flowchart explaining operations in Embodiment 1.

Next description is made for operations. FIG. 2 is a graph showing correlation between a machining speed and a rotational speed according to Embodiment 1, and FIG. 3 is a flowchart explaining operations in Embodiment 1. Similar to the discharge machining apparatus based on the conventional technology, the electrode 1 is rotated and controlled by the rotating device 4 when machining is started for executing machining. At this time, in the Embodiment1, the short-circuit determination reference time changing means 11 provides an appropriate short-circuit determination reference time according to rpm of the electrode.

FIG. 2 shows change in a machining speed according to change in rpm in a case where the short-circuit determination reference time is changed. In FIG. 2, when rpm is 1000, a short-circuit duration time Ts for one rotation becomes smaller, so that the machining speed becomes faster in a case where the short-circuit determination reference time is shortened and set to 20 ms. On the contrary, the short-circuit duration time Ts for one rotation becomes larger when the rpm is low, namely, for instance, around 300 rpm, so that a short-circuit evading operation is executed for each rotation if the short-circuit determination reference time is short, and machining enters into a hunting state, and as a result, the machining speed is extremely decreased.

With the features as described above, at first rpm of the electrode 1 is detected by the short-circuit determination reference time changing means 11 (Step S31), and when the detected rpm is lower than the value detected last (Step S32), processing is executed for making further longer the short-circuit determination reference time stored in the parameter memory 10 (Step S33). Then system control shifts to Step S34. When it is determined that the rpm has not decreased (Step S32), system control shifts to Step S34.

When generation of a short-circuit is detected by the short-circuit detecting circuit 7 in Step S34, duration of a short-circuit, namely a short-circuit duration time is measured by the short-circuit duration time determining device 9, and then the duration of a short-circuit is compared to the short-circuit determination reference time stored in the parameter memory 10. When it is determined, as a result of comparison, that the duration of a short-circuit has surpassed the short-circuit determination reference time (Step S35), the fact is transmitted from the short-circuit duration time determining device 9 to the short-circuit back control device 8, and the short-circuit evading operation of the rotating device 4 is controlled by the short-circuit back control device 8 (Step S36).

Then, system control returns to Step S31. It should be noted that, in a case where the a short-circuit ends before the duration of the short-circuit surpasses the short-circuit determination reference time during determination by the short-circuit duration time determining device 9 (Step S37), it is not necessary to evade generation of a short-circuit, so that system control returns to Step S31 to repeat the processing as described above.

When generation of a short-circuit is not detected in Step S34, the operating sequence from Step S31 is repeatedly again unless it is required to finish the discharge machining (Step S38).

As described above, the short-circuit determination reference time changing means 11 changes the short-circuit determination reference time stored in the parameter memory 10 according to rpm of the electrode 1, so that the short-circuit duration time determining device 9 operates the short-circuit back control device 8 when duration of a short-circuit has surpassed the changed short-circuit determination reference time, and executes the short-circuit evading operation for the electrode 1.

As explained above, according to Embodiment 1, the short-circuit determination reference time is changed according to decrease of the rpm (or the rotational speed) so that the short-circuit determination reference time becomes longer, and a short-circuit generated due to axial deflection for each rotation is neglected; whereby it is possible to execute machining without hunting under stable conditions. Also, it is possible to properly execute electrode-feed control based on an average voltage between the electrodes even if a microscopic short-circuit for one rotation is neglected as described above.

Generally the short-circuit determination reference time is automatically changed corresponding to a change in rpm, but in a case where the rpm is known from the beginning, it is possible to previously change and switch contents of the parameter memory 10 manually or by a program.

According to Embodiment 1 as described above, the short-circuit evading operation is controlled by changing the short-circuit determination reference time; but it is possible to control the short-circuit evading operation by changing a short-circuit back gain like in Embodiment 2 as explained below.

Figure 4:
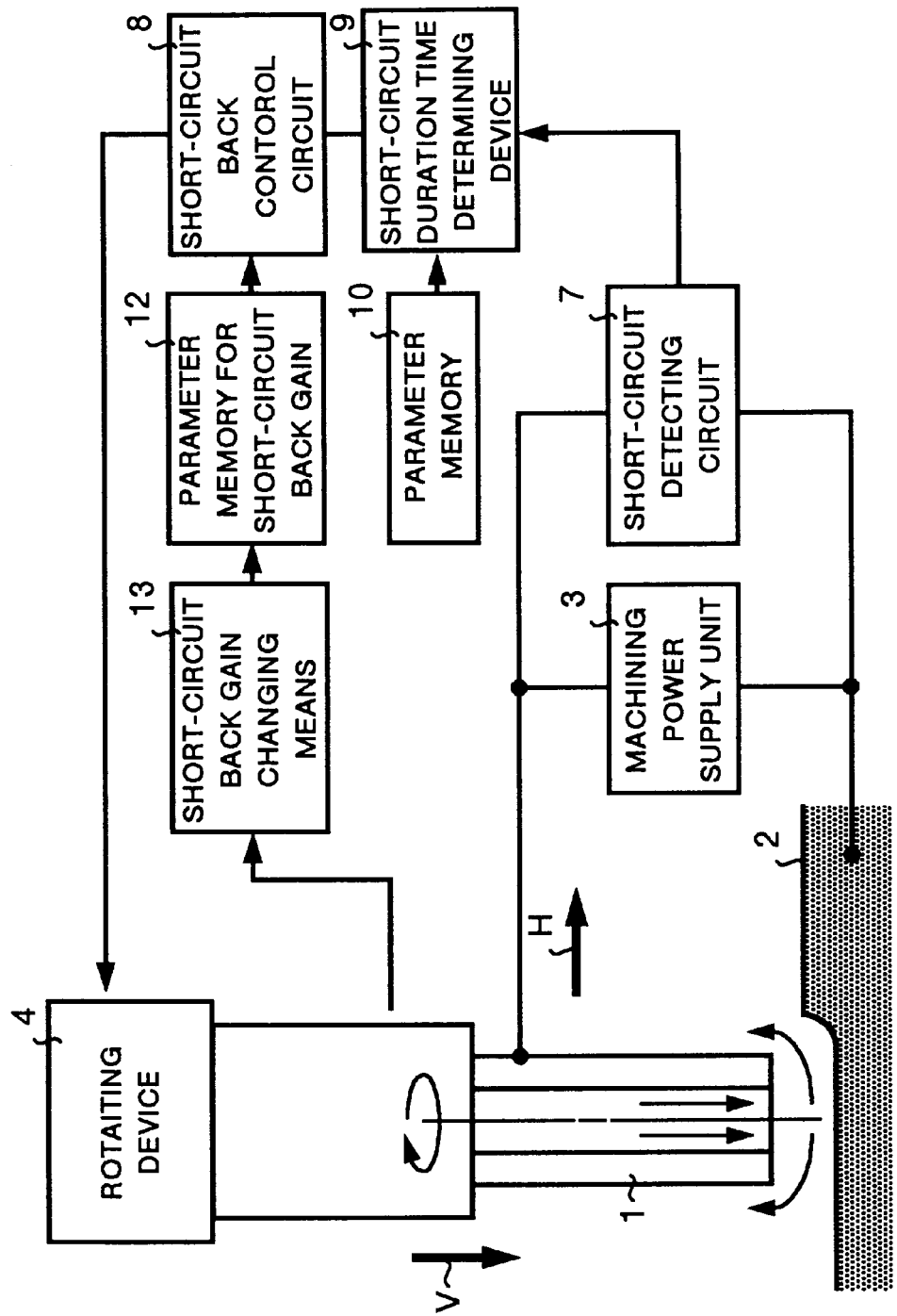
FIG. 4 is a view showing configuration of a discharge machining apparatus according to Embodiment 2 of the invention.

At first, description is made for configuration of the discharge machining apparatus. In Embodiment 2, the same reference numerals as those used in FIG. 1 are assigned to components corresponding to those in Embodiment 1 described above, and description thereof is omitted herein. FIG. 4 is a view showing configuration of a discharge machining apparatus according to Embodiment 2 of the present invention. As for the discharge machining apparatus shown in FIG. 4, the short-circuit determination reference time changing means 11 according to Embodiment 1 does not exist, and the short-circuit determination reference time set in the parameter memory 10 is kept constant regardless of rpm. A parameter memory for a short-circuit back gain 12 connected to the short-circuit back control device 8 and a short-circuit back gain changing means 13 form configuration changeable according to rpm.

The parameter memory for a short-circuit back gain 12 is a memory for setting a short-circuit back gain value (information concerning a speed of short-circuit evading operation ), and the short-circuit back gain changing means 13 changes the short-circuit back gain value in the parameter memory for a short-circuit back gain 12 according in response to rpm of the electrode 1.

Figure 5:
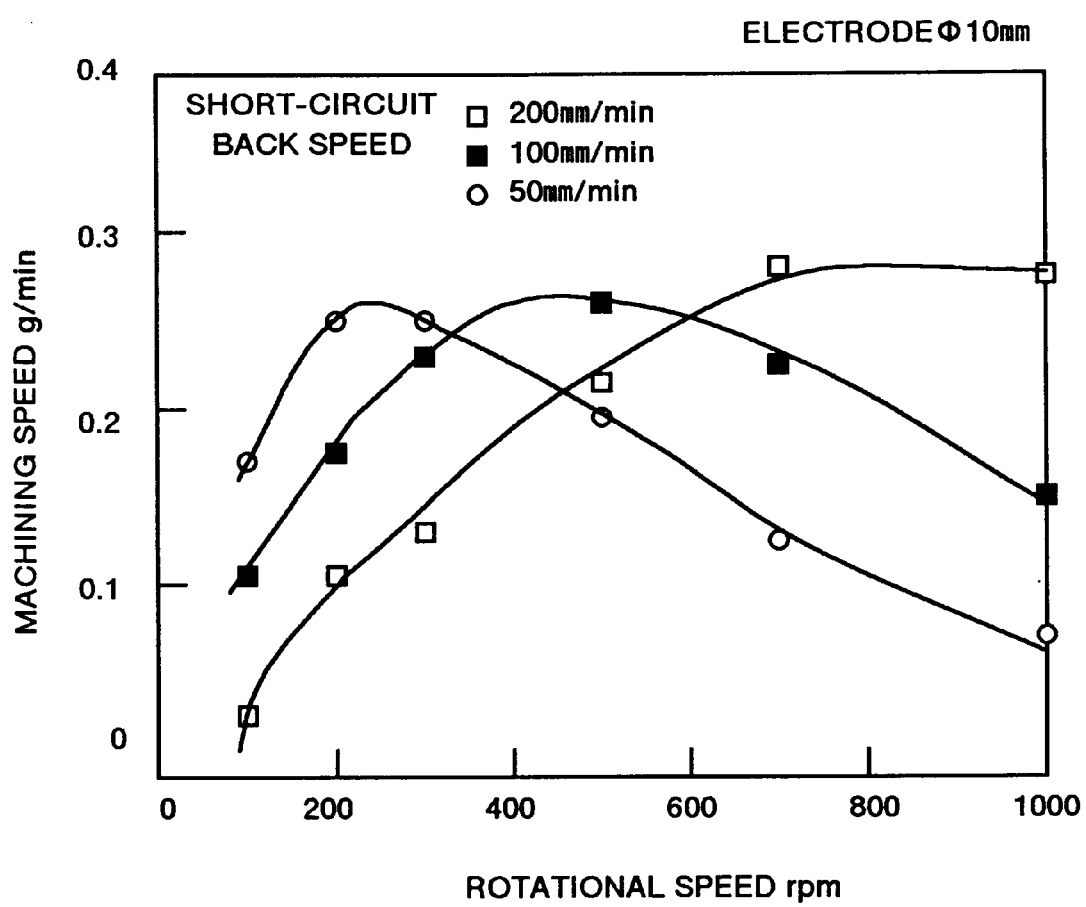
FIG. 5 is a graph showing correlation between a machining speed and a rotational speed in Embodiment 2.
Figure 6:
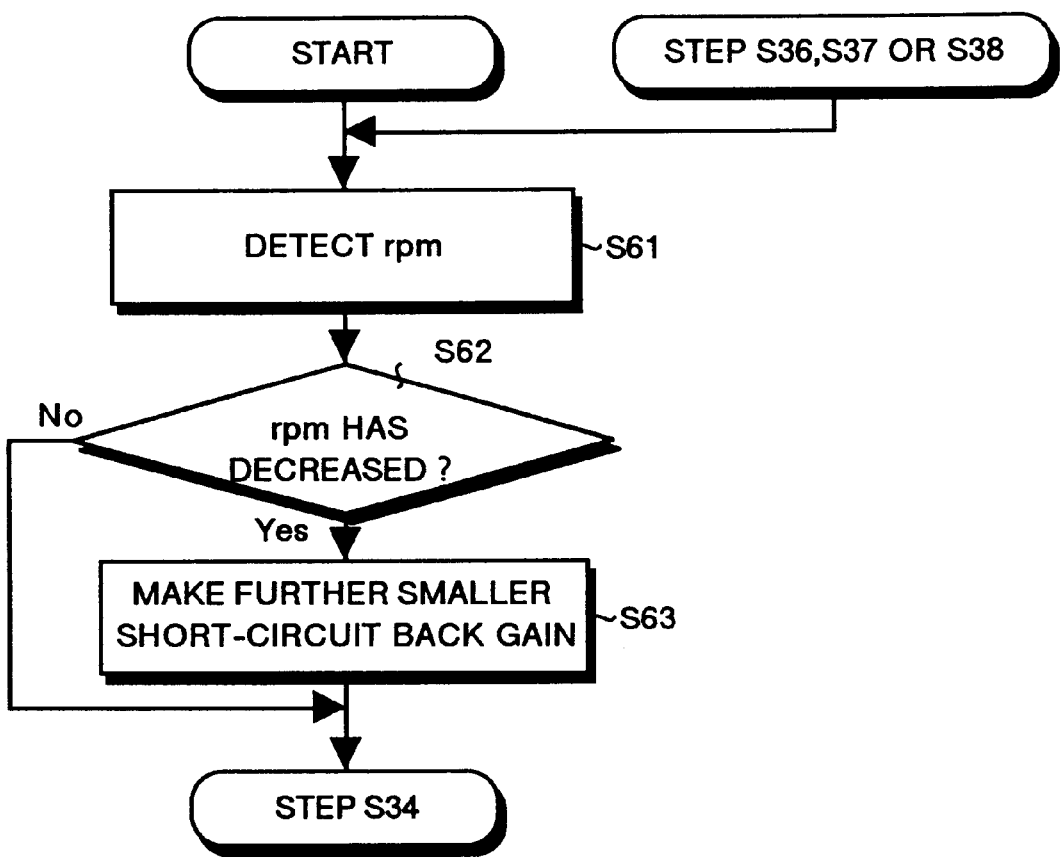
FIG. 6 is a flowchart explaining operations in Embodiment 2.

Next description is made for operations. FIG. 5 is a graph showing a relation between a machining speed and a rotational speed in Embodiment 2, and FIG. 6 is a flowchart explaining operations according to Embodiment 2. Similar to Embodiment 1 described above, the electrode 1 is rotated and controlled by the rotating device 4 when machining is started, and discharge machining is executed. In Embodiment 2, the short-circuit back gain changing means 13 sets an appropriate short-circuit back speed according to the rpm (or the rotational speed) of the electrode 1 during machining.

FIG. 4 shows change of a machining speed in response to change in rpm when the short-circuit back gain is changed. In FIG. 4, a short-circuit duration time Ts for one rotation becomes smaller when the rpm is 1,000 rpm, so that a frequency of a short-circuit back becomes lower, and machining is stabilized even if the short-circuit back speed is fast as 200 mm/mm, and for this reason it is possible to obtain a fast machining speed.

On the contrary, when the rpm is low, namely, for instance, around 300 rpm, the short-circuit duration time Ts for one rotation becomes larger and also a frequency of a short-circuit back becomes higher, so that the short-circuit back speed becomes 200 mm/mm, which means that a short-circuit back quantity for one rotation becomes larger. As a result, machining enters into the hunting state and the machining speed is remarkably lower.

Operations in Embodiment 2 are similar to those in Embodiment 1, the basic operational flow of which was were described, so that description is made herein only for operations different from those in Embodiment 1.

In Embodiment 2, at first rpm of the electrode 1 is detected by the short-circuit back gain changing means 13 (Step S61), and when it is determined that the detected rpm is lower than the value detected last (Step S62), processing is executed for changing the short-circuit back gain stored in the parameter memory for a short-circuit back gain 12 so that the short-circuit back gain becomes further smaller (Step S63). Then system control shifts to Step S34. If it is determined that the detected rpm is not lower than the rpm detected last (Step S62), system control shifts to step S34. Then, the operations as those in Embodiment 1 described above are executed in this step and on.

As described above, the short-circuit back gain changing means 13 changes the short-circuit back gain stored in the parameter memory for a short-circuit back gain 12 according to rpm of the electrode 1, so that the short-circuit back control device 8 controls the short-circuit evading operation based on the changed short-circuit back gain. (This operation corresponds to Step S36 in Embodiment 1.)

As explained above, in Embodiment 2, an operation for evading a short-circuit to be executed due to a short-circuit generated for each rotation because of axial deflection is suppressed by changing the short-circuit back gain in response to decrease of the rpm (or the rotational speed) to make the short-circuit back gain smaller, whereby stable machining without hunting can be executed. It should be noted that proper control over electrode feed can be provided according to an average voltage between the electrodes, even if the microscopic short-circuit is ignored.

Generally the short-circuit determination reference time is automatically changed corresponding to a change of the rpm, but, when the rpm is known from the beginning, it is possible to previously change and switch contents of the parameter memory for a short-circuit back gain 12 manually or with a program.

Applying Embodiment 1 and Embodiment 2 described above, it is possible to execute machining by automatically adjusting a short-circuit determination reference time or a short-circuit back gain so that electrode-feed velocity information, a discharge frequency, or an average current during machining becomes maximum according like in Embodiment 3 described below. In this case, it is possible to execute machining by automatically adjusting a short circuit determination reference time or a short-circuit back gain in the optimal states respectively according to change of rpm (or a rotational speed) or axial deflection.

Figure 7:
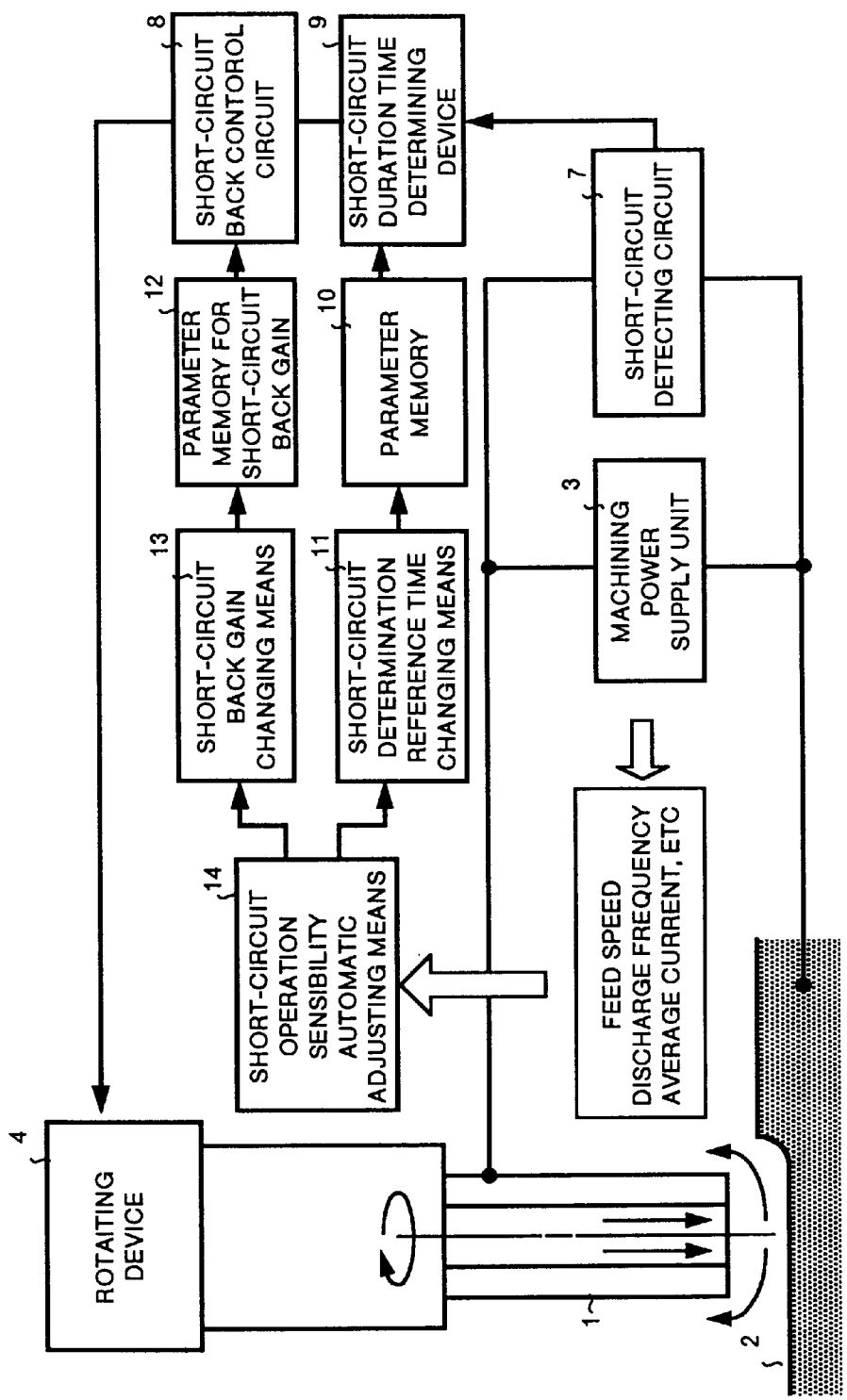
FIG. 7 is a view showing configuration of a discharge machining apparatus according to Embodiment 3 of the invention.
Figure 8:
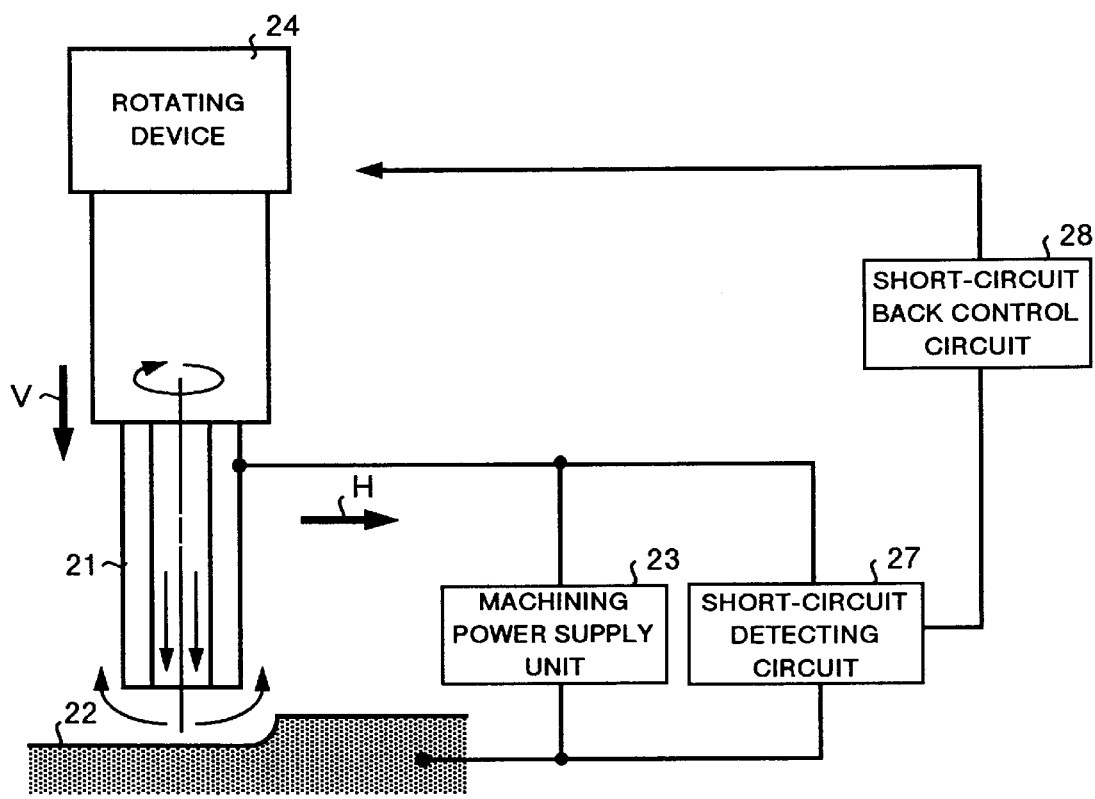
FIG. 8 is a view showing configuration of a discharge machining apparatus according to the conventional technology.
Figure 9A:
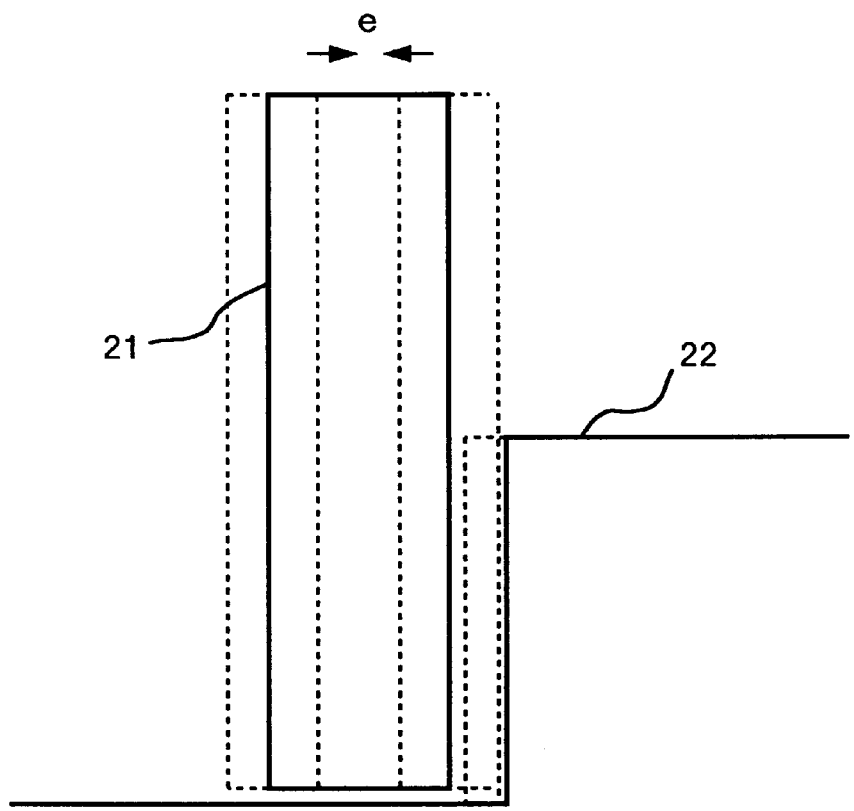
FIGS. 9A and 9B are views explaining axial deflection of a discharge machining apparatus based on the conventional technology.
Figure 9B:
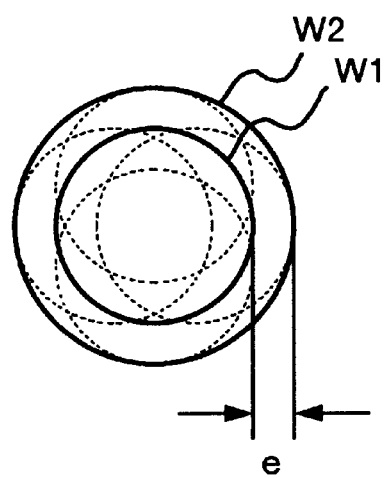
Figure 10:
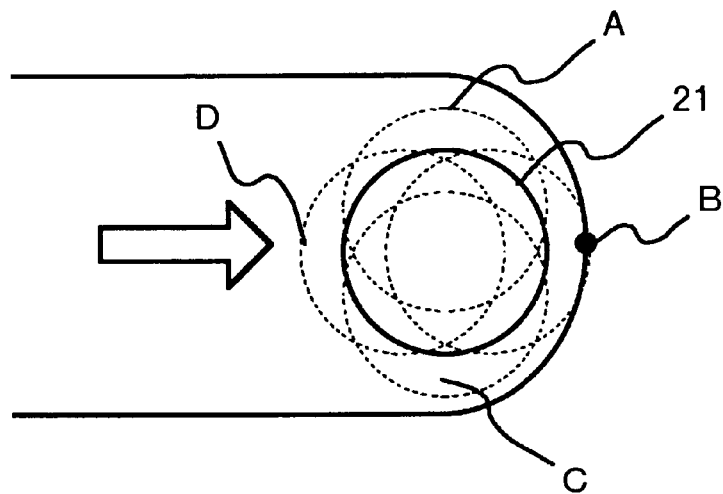
FIG. 10 is another view explaining axial deflection in a discharge machining apparatus based on the conventional technology.
Figure 11:
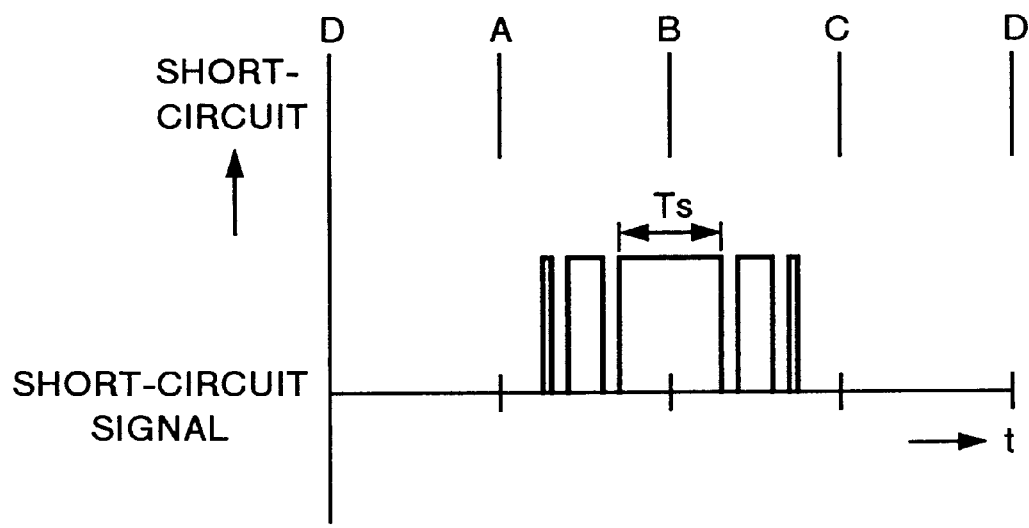
FIG. 11 is a view explaining generation of a short-circuit by the axial deflection of a discharge machining apparatus based on the conventional technology.

At first, description is made for the configuration. In Embodiment 3, the same reference numerals as those used in FIG. 1 and FIG. 4 are assigned to components corresponding to those in Embodiment 1 and Embodiment 2 described above, and description thereof is omitted herein. FIG. 7 is a view showing configuration of a discharge machining apparatus according to Embodiment 3 of the present invention. The discharge machining apparatus shown in FIG. 7 has the configuration in which major sections in Embodiment 1 and those in Embodiment 2 coexist. Namely, the discharge machining apparatus comprises two processing systems; one processing system for changing a short-circuit back gain according to rpm (the short-circuit back gain changing means 13, the parameter memory for a short-circuit back gain 12, and the short-circuit back control means 8), and the other processing system for changing a short-circuit determination reference time according to the rpm (the short-circuit determination reference time changing means 11, the parameter memory 10, and the short-circuit duration time determining device 9).

In the discharge machining apparatus, a short-circuit operation sensibility automatic adjusting means 14 is newly added and connected to the short-circuit back gain changing means 13 as well as to the short-circuit determination reference time changing means 11. This short-circuit operation sensibility automatic adjusting means 14 automatically changes the short-circuit determination reference time changing means 11 and the short-circuit back gain changing means 13 based on information concerning a speed of electrode feed, a discharge frequency, or an average current during machining each obtained from a machining power supply unit 3 or a controlling device not shown herein so that the machining efficiency becomes maximum.

Next description is made for operations. The discharge machining apparatus in FIG. 7 detects a change of rpm (or a rotational speed) of the electrode 1 with the short-circuit operation sensibility automatic adjusting means 14, and changes the short-circuit determination reference time to be longer when the rpm is decreased as described in Embodiment 1, or changes the short-circuit back gain value to be further smaller. The short-circuit operation sensibility automatic adjusting means 14 automatically changes the object to be changed; namely either one of or both of the short-circuit determination reference time and the short-circuit back gain.

As described above, in Embodiment 3, discharge machining is executed by automatically adjusting the short-circuit determination reference time or the short-circuit back gain in response to a change of rpm or a rotational speed of the electrode 1 so that the machining efficiency becomes maximum, whereby it is possible to suppress an unnecessary short-circuit evading operation caused by axial deflection of the electrode during machining even in a case where axial deflection rate and a machining condition are changed, and also it is possible to execute machining under stable conditions, which enables to remarkably improve a machining speed as well as machining precision.

As described above, with a discharge machining apparatus according to the present invention, when machining a work, a short-circuit determination reference time is changed according to rpm or a rotational speed of a rotating electrode, duration of a short-circuit detected between electrodes is measured, and a short-circuit is evaded when the duration of a short-circuit has surpassed the short-circuit determination reference time; whereby discharge machining is executed by changing the short-circuit determination reference time according to rpm or the rotational speed of the rotating electrode; thus, as a result, there is provided the advantage that it is possible to obtain a discharge machining apparatus enabling to suppress an unnecessary short-circuit evading operation caused by axial deflection of the electrode during machining as well as to stabilize machining and further remarkably improve a machining speed as well as machining precision.

With the discharge machining apparatus according to another feature of the present invention, the short-circuit determination reference time is changed according to decrease of rpm or a rotational speed of the electrode so that the short-circuit determination reference time becomes longer, whereby a short-circuit generated for one rotation due to axial deflection is neglected and machining without hunting can be executed under stable conditions, and as a result there is provided the advantage that it is possible to obtain a discharge machining apparatus enabling to properly execute electrode-feed control based on an average voltage between the electrodes even though a microscopic short-circuit for one rotation is neglected as mentioned above.

With the discharge machining apparatus according to another feature of the present invention, discharge machining is executed by automatically adjusting the short-circuit determination reference time according to a change of rpm or a rotational speed of the electrode so that machining efficiency becomes maximum; as a result there is provided the advantage that it is possible to obtain a discharge machining apparatus enabling to suppress an unnecessary short-circuit evading operation caused by axial deflection of the electrode during machining as well as to stabilize machining in a case where axial deflection rate and a machining condition are changed, and further remarkably improve a machining speed as well as machining precision.

With the discharge machining apparatus according to another feature of the present invention, when machining a work, a short-circuit evading operation speed or short-circuit back gain is changed according to rpm or a rotational speed of the rotating electrode, duration of a short-circuit detected between electrodes is measured, and a short-circuit is evaded according to the short-circuit evading operation speed or short-circuit back gain when the duration of a short-circuit has surpassed the short-circuit determination reference time; whereby discharge machining is executed by changing the short-circuit back gain according to the rpm or the rotational speed of the rotating electrode; and for this reason, there is provided the advantage that it is possible to obtain a discharge machining apparatus enabling to suppress an unnecessary short-circuit evading operation caused by axial deflection of the electrode during machining as well as to stabilize machining, and further remarkably improve a machining speed as well as machining precision.

With the discharge machining apparatus according to another feature of the present invention, the short-circuit evading operation speed or short-circuit back gain is changed according to decrease of the rpm or rotational speed to make the parameter further smaller, whereby an operation for evading a short-circuit due to a short-circuit generated for one rotation because of axial deflection is suppressed and machining without hunting can be stably executed, and as a result there is provided the advantage that it is possible to obtain a discharge machining apparatus enabling to properly execute electrode-feed control based on an average voltage between the electrodes even though a microscopic short-circuit for one rotation is neglected as mentioned above.

With the discharge machining apparatus according to another feature of the present invention, discharge machining is executed by automatically adjusting the short-circuit evading operation speed or short-circuit back gain according to a change of rpm or a rotational speed of the electrode so that machining efficiency becomes maximum; as a result, there is provided the advantage that it is possible to obtain a discharge machining apparatus enabling to suppress an unnecessary short-circuit evading operation caused by axial deflection of the electrode during machining as well as to stabilize machining even in a case where axial deflection rate and a machining condition are changed, and further remarkably improve a machining speed as well as machining precision.

This application is based on Japanese patent application No. HEI 9-155608 filed in the Japanese Patent Office on Jun. 12, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A discharge machining apparatus, for executing discharge machining by rotating a column shaped or pipe shaped electrode and applying a voltage to a space between said electrode and a work, comprising:

a memory storing a short circuit determination reference time;

a changing device changing said short circuit determination reference time according to one of an rpm and a rotational speed of said electrode;

a short circuit detector detecting a short circuit between said electrode and said work;

a determining device comparing a duration of a short circuit with said short circuit determination reference time; and a short circuit controller performing an evading operation when it is determined by said determining device that said duration of said short circuit has reached said short circuit determination reference time.

2. A discharge machining apparatus according to claim 1, further comprising an automatic adjuster controlling said changing device to change said short circuit determination reference time in response to a change of one of the rpm and the rotational speed of said electrode so as to maximize one of an electrode feed velocity, a discharge frequency, and an average current during machining.

3. A discharge machining apparatus according to claim 1, wherein said changing device lengthens said short-circuit determination reference time based on a decrease in one of the rpm and the rotational speed of said electrode.

4. A discharge machining apparatus according to claim 3, further comprising an automatic adjuster controlling said changing device to change said short circuit determination reference time in response to said change of said one of the rpm and the rotational speed of said electrode so as to maximize one of an electrode feed velocity, a discharge frequency, and an average current during machining.

5. A discharge machining apparatus, for executing discharge machining by rotating a column shaped or pipe shaped electrode and applying a voltage to a space between said electrode and a work, comprising:

a first memory storing a short circuit determination reference time;

a second memory storing a short circuit parameter representing one of a short circuit evading operation speed and a short circuit back gain of said electrode; a changing device changing said short circuit parameter stored in said second memory according to one of an rpm and a rotational speed of said electrode;

a short circuit detector detecting a short circuit between said electrode and said work;

a determining device measuring a duration of said short circuit, and making a determination as to whether said duration of said short circuit has reached said short circuit determination reference time; and a short circuit controller executing a short circuit evading operation in response to said determination, in accordance with said short circuit parameter.

6. A discharge machining apparatus according to claim 5, further comprising an automatic adjuster controlling said changing device to change said short circuit parameter in response to a change of one of the rpm and the rotational speed of said electrode so as to maximize one of an electrode feed velocity, a discharge frequency, and an average current during machining.

7. A discharge machining apparatus according to claim 5, wherein said short circuit parameter is decreased by said changing device based on a decrease of one of the rpm and the rotational speed of said electrode.

8. A discharge machining apparatus according to claim 7, further comprising an automatic adjuster controlling said changing device to change said short circuit parameter in response to a change in one of the rpm and the rotational speed of said electrode so as to maximize one of an electrode feed velocity, a discharge frequency, and an average current during machining.

* * * * *